READING APPARATUS

Filed July 27, 1954 5 Sheets-Sheet 1

INVENTORS
WALTER R. SASSAMAN
SIDNEY TEISER
BY Charles Shepard
ATTORNEY

READING APPARATUS

Filed July 27, 1954 5 Sheets-Sheet 2

INVENTORS
WALTER R. SASSAMAN
SIDNEY TEISER
BY Charles Shepard
ATTORNEY

INVENTORS
WALTER R. SASSAMAN
SIDNEY TEISER
BY Charles Shepard
ATTORNEY

READING APPARATUS

Filed July 27, 1954 5 Sheets-Sheet 4

INVENTORS
WALTER R. SASSAMAN
SIDNEY TEISER
BY Charles Shepard
ATTORNEY

Aug. 19, 1958 W. R. SASSAMAN ET AL 2,847,901

READING APPARATUS

Filed July 27, 1954 5 Sheets-Sheet 5

INVENTORS
WALTER R. SASSAMAN
SIDNEY TEISER
BY Charles Shepard
ATTORNEY

United States Patent Office 2,847,901

Patented Aug. 19, 1958

2,847,901

READING APPARATUS

Walter R. Sassaman, Chicago, Ill., and Sidney Teiser, Portland, Oreg., assignors to Microlex Corporation, Rochester, N. Y., a corporation of New York Application July 27, 1954, Serial No. 446,048

9 Claims. (Cl. 88—24)

The invention relates to a reader apparatus which illuminates the underside of a manually positioned card bearing microphotographed material whereby any desired portion of such card is optically enlarged and projected onto a reading screen which is disposed in rearwardly spaced relation to a viewing lens and filter.

An object of the invention is to provide an improved reader for use with microphotographed material which permits greatly increased ease and speed of insertion and removal of such microphotographed material from the apparatus.

Another object is to provide a reader having means for intensifying and directing light rays from an illuminating source onto a bottom face of a card containing microphotographed material.

Still another object is to provide a reader having an adjustable optical system for enlarging and projecting an image of microphotographed material onto a reading screen.

A further object is to provide a reader having a reading screen and a viewing lens positioned forwardly of the reading screen whereby said lens magnifies the image on the screen, provides even screen illumination, facilitates high illumination to the operator's eye from a relatively low illuminating source, establishes a virtual image and increases the viewing area over that of presently known readers.

A still further object is to provide a reader having a filter positioned forwardly of a viewing lens which reduces the effects of reflected light from outside sources upon the quality of the screen image thereby increasing the contrast between the screen image and the screen source. The location of the lens relative to the reading screen, permitting the use of a reduced screen to produce a given size virtual image.

A still further object is to provide a reader having adjustable card support means adapted to accurately position a reading card and thereby correct for any inaccuracies resulting from mass production methods.

A still further object is to provide a reader, capable of being produced by mass production methods, which is portable, requires little or no maintenance or adjustment and is adapted for use with a page finder card for accurately and quickly locating the microphotographed material desired.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
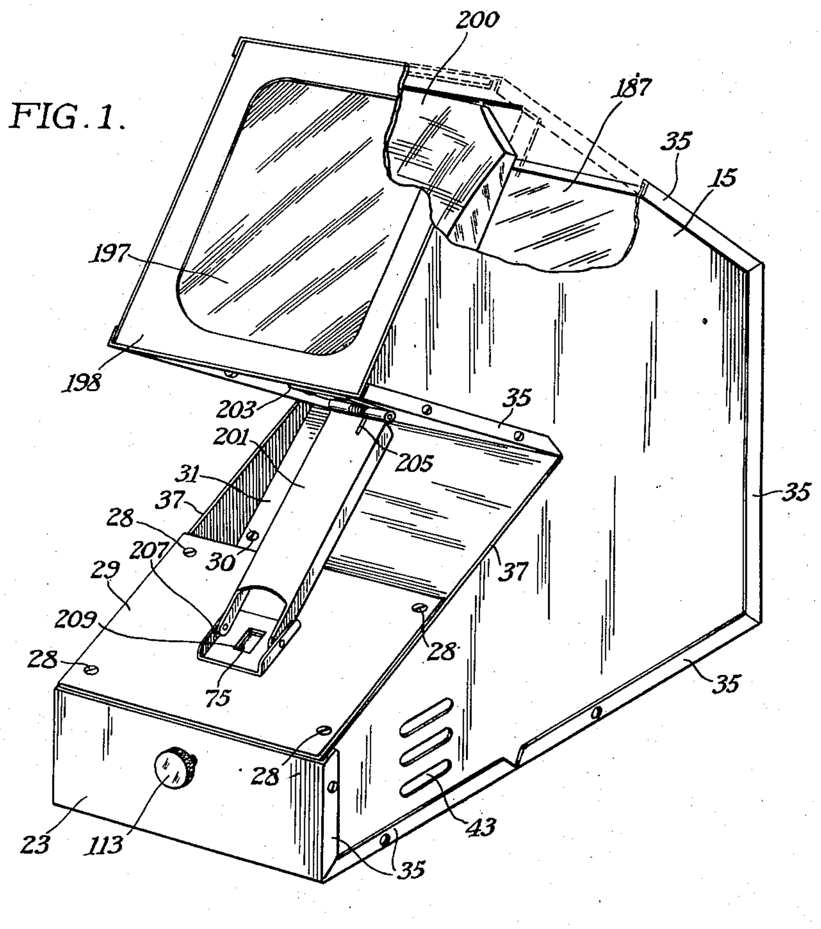
Fig. 1 is a perspective view of the reader apparatus with a portion thereof being broken away.

In view of the great savings in time, supplies, transportation and storage space, there has been a steadily growing trend for various types of material, such as reference data, documents, and records to be preserved by microphotographic procedures.

The portable reader of the present invention is designed to provide more satisfactory results, lessen manufacturing and maintenance costs, and reduce the physical size of the reader over readers presently known by employing an illuminating and optical system which facilitates enlargement and projection of microphotographed material from the underside of a reference card to a reading screen which is located in rearwardly spaced relation to a viewing lens and filter.

In the preferred embodiment of the invention, the reader enclosing cabinet structure is formed of a plurality of sections detachably secured to form an integral unit. The cabinet structure includes a pair of side walls 15 and 17, a bottom wall 19, a bottom portion 21, a front wall 23 having one edge integral with the bottom portion, a rear wall 25, a top wall 27 formed as an extension of the rear wall, a card rest 29 and a one-piece V-shaped section having a front face 31 and top face 33. Along the side edges of the bottom, front, rear, and top walls, the bottom portion 21, and the top face 33 are provided flanges 35 against which the side walls 15 and 17 are seated and fastened by means such as spot welds and self-threading screws. On the inside faces of the side walls 15 and 17, below and parallel to the side wall inclined edges 37, are fixed, as by welding, angle brackets 39 on which is adjustably mounted, by machine screws 28, a card rest 29. Machine screws 28 are adapted to be threaded through the brackets 39 to position the card rest in a perpendicular relationship with the axis of the focusing lens described hereafter. The front face 31 of the V-shaped cabinet section is attached by screws 30 to angle brackets 41 which are welded to the inside faces of the side walls 15 and 17 as to have the free edge of the front face 31 lie below and spaced from the adjacent edge of the card rest and provide a ventilating opening therebetween.

To facilitate the entrance of ventilating air currents to cool the illuminating means, elongated slots 43 are provided in the side walls, openings 45 are disposed through the bottom portion 21, and pads 47 are formed in the bottom portion and bottom wall to space the reader away from its supporting fixture. Insulating members 49 and 51 are bolted or riveted to the inside faces of the front wall 23 and card rest 29 to diminish the transfer of heat from the illuminating source to the exterior of this area of the cabinet structure to prevent discomfort or injury to the user of the reader or damage to the cards.

Located on the inner faces of the side walls 15 and 17, at approximately right angles to the plane of the card rest 29, are a pair of angle brackets 53, on the forward face of which is mounted a partition wall 55. Fixed to the rear side of the partition wall 55 adjacent the top edge thereof is an angle bracket 57 on which the free edge of the cabinet front face 31 rests. Between the longitudinal axis and the top edge of the partition wall 55, and substantially on the transverse axis of the partition wall, is an approximately rectangular opening 59 which permits the passage of light rays from the illuminating and optical system to be described.

On the forward face of the partition wall 55 is a box-like mirror housing having top and bottom walls 61 and 63, which are approximately parallel to the plane of the card rest 29, and front and side walls 65 and 67, respectively, which are approximately perpendicular to the plane of the card rest. The rear portion of the housing is open and is maintained in alined relationship with the partition wall opening 59 by fasteners such as screws 60 which extend through the housing side wall flanges 69 and into the partition wall. The front wall 65 of the mirror housing is of less height than the housing side walls 67 to provide an opening 71 between the edges of the housing top and front walls through which a portion of a mirror mount extends as described hereafter.

Extending through the housing top wall 61 is an aperture 73 which is in axial alinement with openings 75 and 77 provided in the card rest 29 and insulating member 51. Mounted within the aperture 73 for axial movement is a cylindrical socket member 79 having a peripherally extending shoulder 81 at its upper end. Disposed within the socket member 79 is a lens 83 for focusing the light rays from the illuminating means to be described.

Within the mirror housing is a mirror 85 supported at an angle between the front and bottom walls 65 and 63 by a mirror mount which has a support portion 87 and an integral upwardly disposed flange 89 which passes through the opening 71 between the mirror housing front and top walls and extends above the housing top wall. Projections 91 are provided on the bottom face of the mount support portion 87 and threaded openings are disposed through the support portion and projections for receiving mirror retaining screws 93 which maintain the mirror in fixed position. The flange 89 of the mirror mount has a pair of openings adjacent the forward edge of the housing top wall through which screws 95 pass for securing the flange to the housing top wall.

Extending transversely of the mount flange 89 and above the housing top wall is an elongated slot 97 through which passes a focusing lever 99. The end of the focusing lever 99. The end of the focusing lever adjacent the socket member 79 has an arcuate edge 101 which engages the socket member 79 below the socket shoulder 81. The opposite end of the focusing lever is secured to a focusing arm 103 which has a downwardly extending flange 105 disposed in the path of a focus adjusting screw 107 supported on the front wall 23. An internally threaded bushing 109, having a peripheral flange 111 secured to the inside face of the cabinet front wall 23, guides the screw 107 as the knurled screw knob 113, located forwardly of the front wall, is rotated to urge the head 115 of the screw 107 against the focusing arm flange 105. Therefore, manipulation of the focus adjusting screw 107 towards or away from the focusing arm flange 105 causes the focusing lever 99 to oscillate about the mirror mount flange 89 and thus permits the focusing lever to elevate or lower the focusing lens socket until the desired image is obtained.

To limit the upward movement of the focusing lens socket relative to the mirror housing top wall 61, an angular focusing spring 117 is provided. One end of the spring is disposed within a cut-out portion formed in a flange of the angle bracket 57 and is held against the rear face of the partition wall 55 by screws 118. The other end of the spring 117 is positioned above the socket member 79 to engage the top surface of the socket shoulder 81 as the socket is moved upwardly. The edge of the spring 117 adjacent the socket 79 has an arcuate edge 119 to permit the passage of light rays through the focusing lens without interference.

Disposed along each side of the mirror housing and forwardly of the partition wall 55 is a lamp, a spherical mirror for reflecting light rays from the lamp, and a condenser lens for intensifying the reflected light rays. Since the lamp, spherical mirror, and condenser lens on each side of the mirror housing are of duplicate construction, the description will be limited to only one set of these elements.

A lamp mount is supported from the front face of the partition wall 55 by the flange 121 of an angle bracket welded to the partition wall adjacent the top corner thereof. The lamp mount is positioned transversely of the reader to have its longitudinal axis lie in a plane passing through the axis of the focusing lens. The lamp mount includes a portion 123 which is disposed in a plane parallel to that of the card plate 29 and a bent portion 125 which extends downwardly towards the mirror housing and forms an obtuse angle with the portion 123. Along the longitudinal axis of the lamp mount and through the portions 123 and 125 are openings 127 and 129, respectively. The opening 127, located in the portion 123, receives a lamp socket 131 provided with a flange 133 which rests on the top face of the portion 123 and is fastened to the angle bracket flange 121 by bolt 135. Lamp 137, of the bayonet plug type, is retained in the socket 131 with its axis parallel to that of the focusing lens and approximately at right angles to the card rest 29. On the top face of the lens mount portion 125, over the opening 129, is seated a condensing lens 139 which is maintained in position by a lens retainer overlying the lens and having an opening 141 through which a portion of the condenser lens 139 projects. The lens 139 has a diameter greater than that of the lamp mount opening 129 and the lens retainer opening 141 and is therefore gripped between the lamp mount portion 125 and the lens retainer apertured flange 143 when the flange 143 is fixed by means of the lens retainer flange 145 and bolt 147.

The spherical mirror 149 is positioned below the lamp 137 and in axial alinement with the condenser lens and the center of the card rest opening 75 by a mirror mount which is fixed by bolt 151 to the forwardly extending flange 153 of an angle bracket secured to the front face of the partition wall below the angle bracket flange 121. The mirror mount includes a vertical flange 155 disposed in a plane at approximately right angles to the card rest 29 and an angular flange 157 which lies in a plane parallel to the lamp mount portion 125. A mirror retainer is secured by flange 159 and bolt 161 to the vertical flange 155 of the mirror mount and has a bent flange 163 which is parallel to and spaced downwardly from the mirror mount flange 157. The spherical mirror 149 is gripped between the flanges 157 and 163, directly below the mirror mount flange opening 165, with its edges abutting against the downwardly extending struckout tabs 167 formed in the flange 157.

Disposing the lamps, spherical mirrors, and condensing lenses in a manner as set forth above locates the axes of the lamps, spherical mirrors, condenser lenses, focusing lens, and card rest opening all in a plane which lies at approximately right angles to the card rest. Further, the spherical mirrors are in axial alinement with the condenser lenses and the center of the card rest opening 75 and thus light rays from the lamps 137 will be reflected by the spherical mirrors 149 through the condensing lenses 139 to the card rest opening 75 and illuminate the microphotographed matter on a card positioned above the card rest opening 75.

To insure proper operating voltage for the lamps 137, a step-down transformer 169, supported by angle bracket 171 welded to the inside face of a cabinet side wall, is provided. The inlet cord 173 connects with the operating switch 175 and the transformer primary winding and conductors 170 and 172 connect the lamps in a series circuit with the transformer secondary winding.

On the inside face of the cabinet rear wall 25 is secured a flanged mirror bracket 177 on which is supported, by screws 179 and washers 181, a mirror 183 provided with a U-shaped shock absorbing rubber strip 185 along its top and bottom edge which rest on the bracket flanges and which also serve to space the mirror from the bracket. The mirror 183 is positioned relative to the mirror 85 so that light rays which are reflected onto the mirror 85 from the surface of the card fall upon the mirror 183 in position to be reflected forwardly and upwardly to a translucent reading screen 187.

Figure 7:
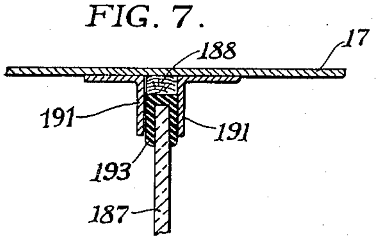
Fig. 7 is a section taken approximately on the line 7—7 of Fig. 2.
Figures 3, 4, 5:
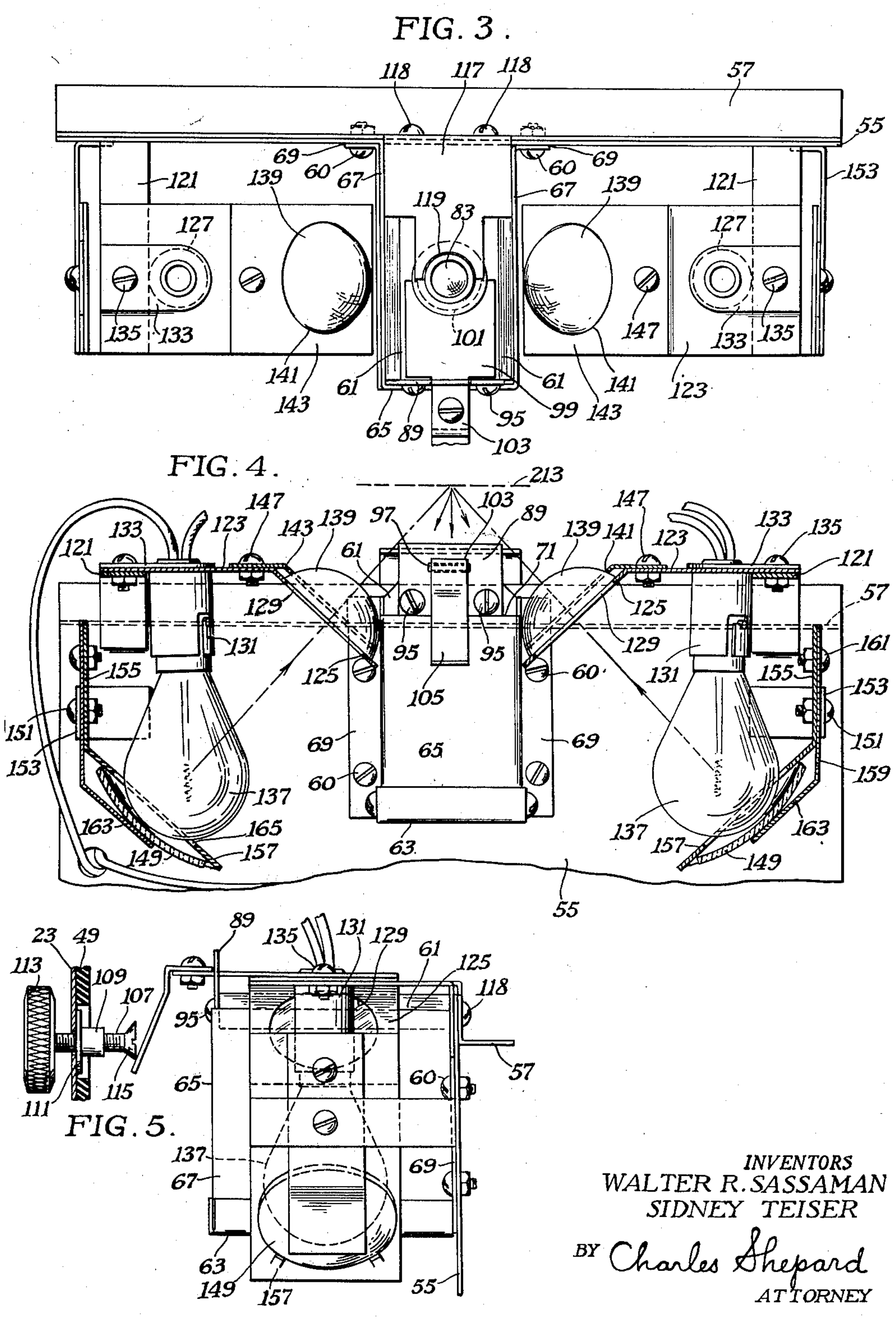
Fig. 3 is a section taken approximately on the line 3—3 of Fig. 2.
Fig. 4 is a front elevation of the structure of Fig. 3 with a portion thereof being broken away.
Fig. 5 is a right side elevation of the structure shown in Fig. 4.
Figure 6:
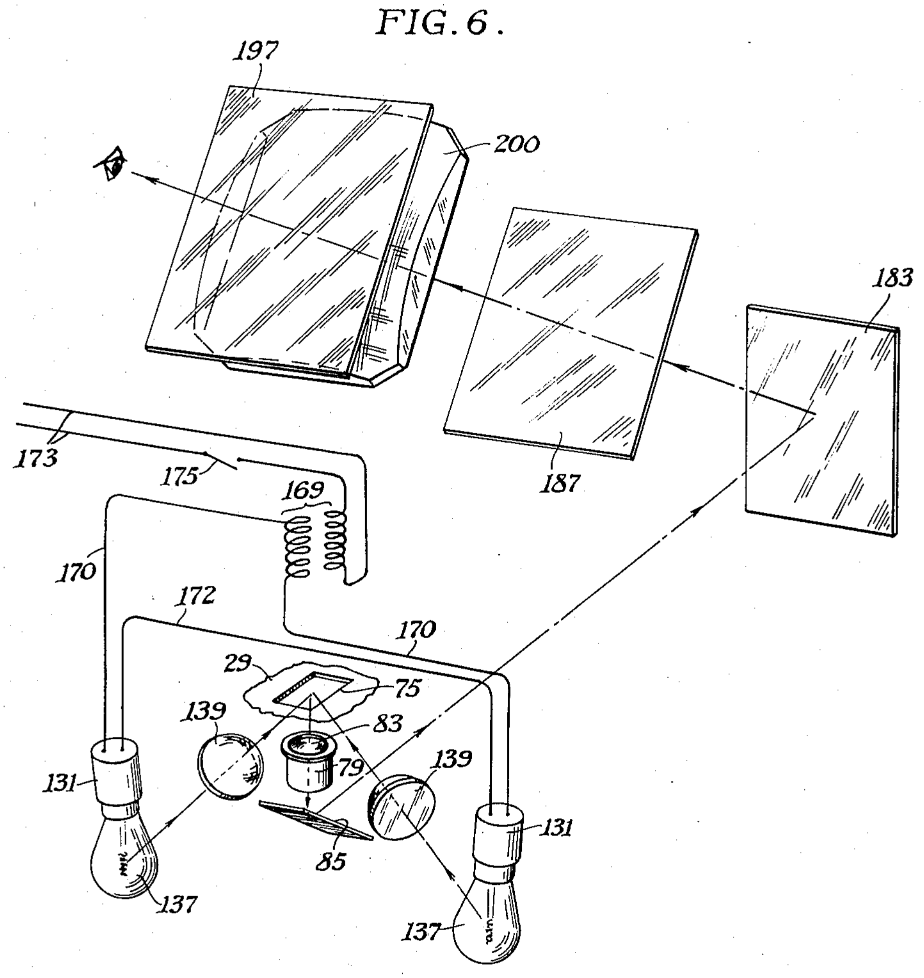
Fig. 6 is a diagrammatic view showing the wiring diagram for the illuminating means, a portion of the light ray intensifying and directing means, the optical system for focusing and projecting the image of the microphotographed material onto the reading screen, the magnifying lens, and filter.
Figure 8:
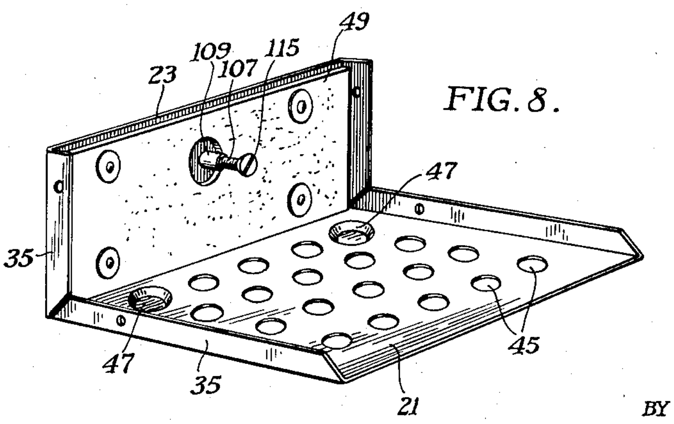
Fig. 8 is a perspective view showing the construction of a section of the reader enclosing structure which is disposed adjacent to the illuminating means.

The reading screen 187 is provided with U-shaped shock absorbing strips 189 and 193 along its top, bottom, and side edges and is fixed in position rearwardly of the front edges of the cabinet side walls between spaced angle brackets 191 which are welded to the cabinet side walls 15 and 17. Between the screen shock absorbing strips 193 and the inside faces of the cabinet side walls 15 and 17 are interposed wooden strips 188 as seen in Fig. 7.

Adjacent the front edges of the cabinet top wall is welded an angle bar 194 against which is seated the rear surface of the top portion of a filter 197, preferably blue in color, with a shock absorbing strip 196, such as felt or rubber, interposed between the filter and angle bar 194. The lower end of the filter rests within a cut-out portion provided in the spacer 206 which is disposed on the inside surface of the cabinet wall 33. The filter is maintained in position by a mask or retainer member 198 having rearwardly directed flanges 199 along its bottom and side edges. The bottom flange 199 of the member 198 fits into a cut-out portion provided in the spacer 206 and is fixed to the reader cabinet by a screw as shown in Fig. 1. The flanges 199 at the sides of the member 198 extend rearwardly into thin spaces between the cabinet side walls 15, 17 and the forward edges of plates 195 which are welded near their rear edges to the inner faces of the respective cabinet walls 15 and 17, thus allowing a little springy play between the walls and the front edges of the plates, to retain the flanges 199 frictionally.

Intermediate the filter 197 and reading screen 187 is an octagonal shaped viewing lens 200, having a convex forward face, which magnifies the image of the microphotographed material appearing on the reading screen, provides a large viewing area forward of the screen within which the operator may move his head without losing the image, and facilitate the formation of a virtual image which results in less eye strain on the operator. In addition, the viewing lens 200 provides even illumination on the screen 187 and high illumination to the operator's eye from a relatively low illuminating source. Welded to the inside face of the side walls, at the corners formed by the cabinet side and top walls and the top face 33 of the cabinet V-shaped section, are triangular shaped brackets 202. The lens 200 is positioned between the front faces of the brackets 202 and the rear edges of above-mentioned plates 195, which are welded to the inside faces of the cabinet side walls 15 and 17, with suitable shock absorbing material 204, such as rubber or cork, interposed between the lens and the cabinet top wall 27 and the plates 195. The spacer 206, positioned between the filter and the lens has a rear edge portion of reduced thickness which is disposed below the lower edge of the lens and thus acts as a shock absorber for the lower end of the lens.

The part of the cabinet which extends forwardly beyond the viewing screen 187 may be referred to as a shadow box or hood, since it excludes stray light from reaching the screen 187 from various lateral directions, thereby making the image on the screen more clearly visible to the observer, for a given power of illumination. The tinted glass plate or filter 197 serves as a closure for the front end of the shadow box, excluding dust which might otherwise accumulate on the lens 200 or the viewing screen 187, and preventing accidental contact with and possible scratching of the magnifying lens 200. The use of the flat filter 197 forwardly of the curved lens 200 is also an advantage in making the reading process more natural and relaxed to the average reader. Such a person is more accustomed, when reading, to look at words on a flat surface rather than a curved one, and the filter 197 provides the user with a familiar flat surface which will not seem strange to him. It may be noted also that the magnifying lens 200 is located quite close behind the filter 197 but is spaced a substantial distance of several inches forwardly from the viewing screen 187. Thus the lens produces a significant and very helpful degree of magnification of the image on the viewing screen 187, which would not be true if the lens were very close to or even formed as part of the viewing screen.

The card containing the microphotographed material is held on the card rest 29 by a channel-shaped card clip arm 201 which is hinged by member 203 to the outer surface of the cabinet top face 33 for vertical movement. A coiled spring 205 urges the card clip arm against the card rest 29. On the free end of the card clip arm is pivotally mounted a card clip plate 207 having an approximately rectangular opening 209 which is alined with the card rest opening 75 when the arm is in operative position.

To facilitate movement of the reader, a carrying handle 211 is provided on the top surface of the top wall 27.

Figure 10:
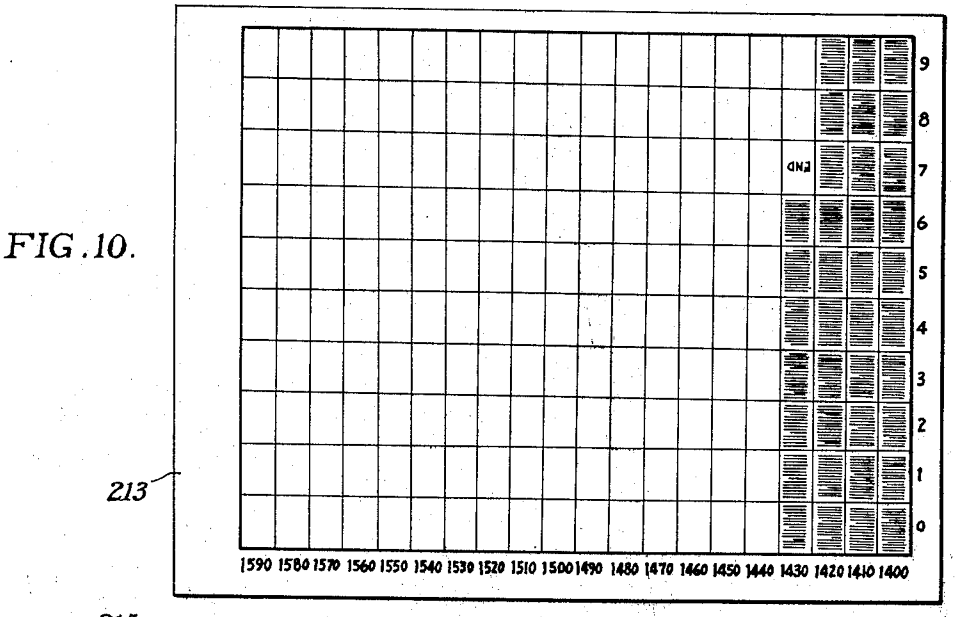
Fig. 10 is a plan view of a typical reference card bearing microphotographed reading matter adapted for use with the reader.

In Fig. 10 there is disclosed a typical reference card 213, adapted for use with the reader of the present invention, having numbers along its bottom edge increasing from left to right in increments of ten. Along the right vertical edge of the card 213 are numbers 0 to 9 which denote page numbers intermediate those along the card bottom edge.

Figure 11:
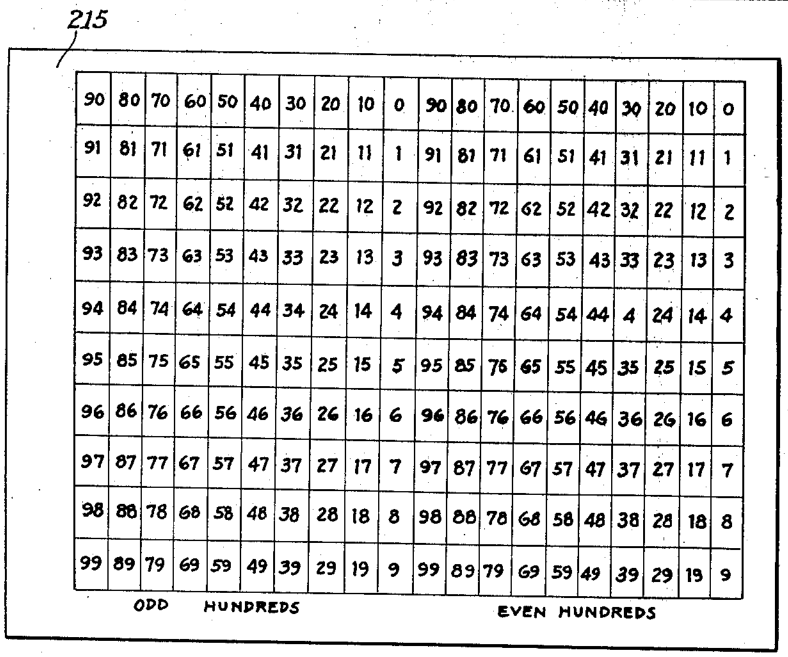
Fig. 11 is a plan of a typical page finder card for locating the desired page on the card shown in Fig. 9.

In Fig. 11 is shown a page finder card employed with a reference card, such as shown in Fig. 10, for locating the desired page of microphotographed matter. The page finder 215 is divided into two equal halves with each half denoted along the bottom edge of the card as "even hundreds" and "odd hundreds." Each of these halves is numbered from 0 to 99 with the numbering starting at the upper right hand corner of each half.

With this arrangement, it is seen that if the page finder card or index card 215 is placed back to back against the image-bearing reference card or data card 213, in congruent relation thereto (the two cards or sheets being of the same length and breadth) and with the zero corner of the index card (upper right corner in Fig. 11) matched with the zero corner of the data card (lower right corner in Fig. 10) then all of the numerical indicia on the index card will be superimposed exactly on the respective miniature images of the pages of the corresponding numbers on the data card or reference card, but will be separated therefrom by the thicknesses of the two cards.

When the two cards are thus placed back to back and are held in that position (which is easy to do because they are of the same size) the index card may be faced toward the eye of the observer, and will serve as a finding means or locating means to enable the observer quickly to determine the position of any desired page or other individual image area on the record card, and to aline the desired individual image area with the optical window 75, notwithstanding the fact that such individual image area is on the remote face of the card and is hidden from direct view by the observer.

Because the index markings or indicia are on a separate card or sheet, rather than being on the back of the record card or sheet bearing the individual miniature images, it follows that the back of the record card or sheet is not disfigured by index markings, and thus may be used for a second set or series of individual miniature images to be enlarged and read by the present machine. In this way, the capacity of each record sheet or data sheet 213 is doubled, as compared with what the capacity would be if the index markings were placed directly on one face of the record sheet, which would confine the useful miniature images to only one face. If, for example, one face of the record sheet carries individual images of 200 pages of a book, another 200 pages may be reproduced on the opposite face of the same record sheet, thus enabling a very economical and compact reproduction of the desired reference material. A single index sheet or card may be used with any selected one of the group or series of reference sheets or cards, since all are of the same size and the same numerical sequence of individual minature reproductions applies to all.

Figure 9:
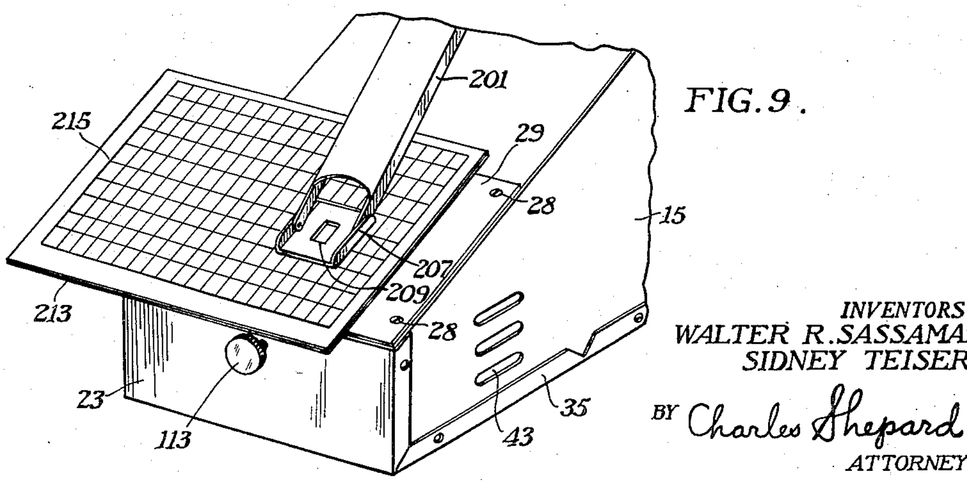
Fig. 9 is a perspective view showing a card containing microphotographed material and a page finder card in use with the reader with a portion of the reader being broken away and with the page finder card free from indicia for purposes of simplicity.
Figure 2:
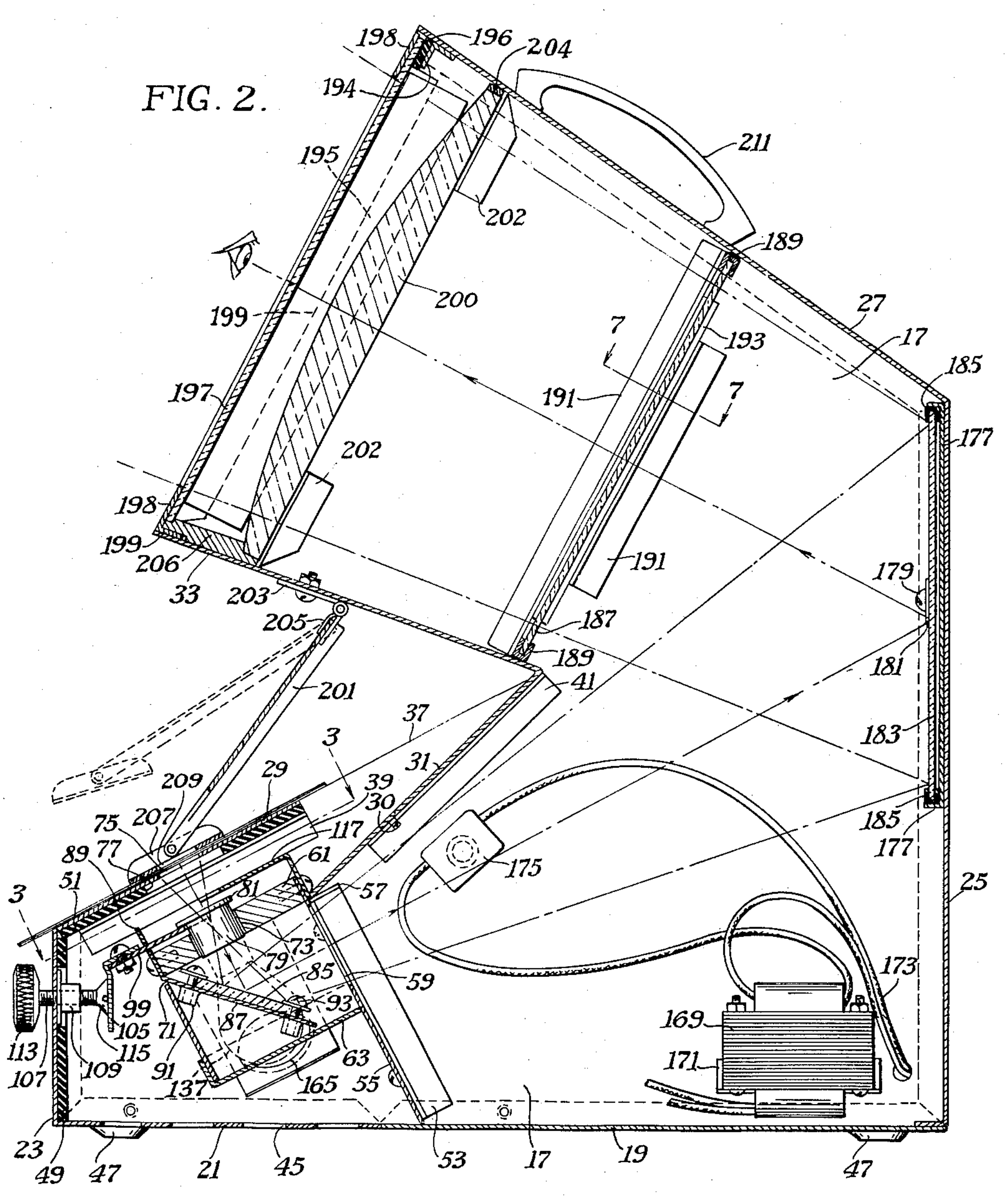
Fig. 2 is a central vertical section taken longitudinally through the reader device.

In use, with the card rest 29 positioned at right angles to the focusing lens axis by screws 28, the card clip arm 201 is raised and the reference card is placed on the card rest with the face of the reference card bearing the desired page adjacent the card rest. Superposed on the referense card is the page finder card with its face visible to the user of the reader device, as shown in Fig. 9. The card clip arm is then released so as to rest the card clip plate 207 on the page finder card. With the edges of the reference and page finder cards aligned, the user moves both cards until the desired page number on the page finder card appears in the card clip plate opening 209. It is evident that since only the bottom surface of the card is to be illuminated, the top surface of the card can be employed for page finding purposes without removal of the page finder card after the desired page has been found.

The operating switch 175 is then actuated and the transformer 169 provides the desired operating voltage for the lamps 137. Light rays from the lamps 137 are reflected by the spherical mirrors 149 through the condenser lenses 139 where these are concentrated. After passing through the condenser lenses, the rays pass through the openings 77 and 75 in the insulation member 51 and card rest 29 and illuminate the surface of the reference card appearing above the opening 75, which is the page of microphotographed material desired to be projected and magnified.

The image of the microphotographed material then passes through the focusing lens 83 onto the mirror 85. From the mirror 85, the image is reflected to the cabinet rear wall mirror 183 from which it is projected onto the reading screen 187. By manipulating the knob 113, the user is able to move the focusing socket 79 towards or away from the mirror 85 and focus the image on the reading screen.

The user is able to read the enlarged image of the microphotographed material by looking through the filter 197 and viewing lens 200, which are both located forwardly of the reading screen. The lens 200 increases the screen illumination evenly, and magnifies the image appearing on the reading screen and the filter 197 prevents any glare on the reading screen from outside sources and also increases the contrast between the image and the reading screen. An additional advantage of locating the lens and filter forward of and spaced from the reading screen is to establish a virtual image thereby resulting in decreased eye strain and increased reading ease.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A reader for use with cards bearing microphotographed material, said reader including a cabinet structure having a card support, an opening extending through said card support in position to permit easy and speedy insertion and removal of cards from said card support, resilient means on said cabinet structure for maintaining a card positioned on said card support, said resilient means having an opening alined with said opening in said card support so that when said card is placed on said support with a portion to be read alined with the opening in the card support, another portion on the opposite face of the card may be seen through said opening in said resilient means, for indexing purposes, means within said cabinet structure for illuminating that portion of a card located above said card support opening, a reading screen fixed within said cabinet structure, and means for enlarging and projecting an image of the illuminated portion of said card onto said reading screen.

2. A construction as defined in claim 1, wherein said illuminating means includes a lamp, a spherical mirror for reflecting light rays from said lamp, and a condenser lens for directing and intensifying light rays from said spherical mirror onto that portion of the card appearing above said card support opening.

3. A construction as defined in claim 1, wherein said image enlarging and projecting means includes a mirror inclined with respect to the axis of said card support opening, a lens for focusing the image of that portion of the card located above said card support opening, and a second mirror for reflecting onto said reading screen the image reflected from said inclined mirror.

4. A construction as defined in claim 1, wherein said reader is provided with a magnifying lens and filter positioned in forwardly spaced relationship to said reading screen, said magnifying lens facilitating even illumination on the reading screen, said magnifying lens being separate from said reading screen and spaced a substantial distance away from said screen toward the eye of the observer, said filter being spaced toward the eye of the observer from said magnifying lens.

5. A construction as defined in claim 4, wherein said filter has a bluish tint to reduce the glare from outside light sources and to increase the screen contrast.

6. The combination with an enlarging projector for miniature images on a substantially opaque sheet, said projector including a sheet supporting plate accessible from one side for placing an image-bearing sheet thereon and having an optical window in said plate of materially less area than the area of the image-bearing sheet, means on the opposite side of said plate for projecting light toward said window to illuminate that part of the area of an image-bearing sheet which is alined with said window, and means including a lens for projecting an enlarged image of the illuminated area of the sheet to a point materially spaced from said window, of a substantially opaque sheet bearing a multiplicity of miniature images on both of two opposite faces of the sheet, said sheet being adapted to have any selected image on either face of said sheet brought into alinement with said optical window so that the selected image may be illuminated and projected, an indexing sheet placeable on the face of said image-bearing sheet which is remote from said optical window, said indexing sheet bearing indexing indica in predetermined relation to images on said image-bearing sheet when said indexing sheet is placed in predetermined overlying relation to said image-bearing sheet, and positioning means on said projector for cooperating with said indexing indicia on said indexing sheet to locate a selected image on said image-bearing sheet in proper alinement with said optical window.

7. The combination with an enlarging projector for miniature images on a substantially opaque sheet, said projector including a sheet supporting plate accessible from one side for placing an image-bearing sheet thereon and having an optical window in said plate of materially less area than the area of the image-bearing sheet, means on the opposite side of said plate for projecting light toward said window to illuminate that part of the area of an image-bearing sheet which is alined with said window, and means including a lens for projecting an enlarged image of the illuminated area of the sheet to a point materially spaced from said window, of a substantially opaque sheet bearing a multiplicity of miniature images on both of two opposite faces of the sheet, said sheet being adapted to have any selected image on either face of said sheet brought into alinement with said optical window so that the selected image may be illuminated and projected, an indexing sheet placeable on that face of said image-bearing sheet which is remote from said optical window, said indexing sheet bearing indexing indicia in predetermined relation to images on said image-bearing sheet when said indexing sheet is placed in predetermined overlying relation to said image-bearing sheet, and positioning means on said projector for cooperating with said indexing indicia on said indexing sheet to locate a selected image on said image-bearing sheet in proper alinement with said optical window, said positioning means including a presser foot member overlying said optical window and resiliently pressing an interposed indexing sheet and image-bearing sheet toward said optical window.

8. The combination with an enlarging projector for miniature images on a substantially opaque sheet, said projector including a sheet supporting plate accessible from one side for placing an image-bearing sheet thereon and having an optical window in said plate of materially less area than the area of the image-bearing sheet, means on the opposite side of said plate for projecting light toward said window to illuminate that part of the area of an image-bearing sheet which is alined with said window, and means including a lens for projecting an enlarged image of the illuminated area of the sheet to a point materially spaced from said window, of a substantially opaque sheet bearing a multiplicity of miniature images on both of two opposite faces of the sheet, said sheet being adapted to have any selected image on either face of said sheet brought into alinement with said optical window so that the selected image may be illuminated and projected, an indexing sheet placeable on that face of said image-bearing sheet which is remote from said optical window, said indexing sheet bearing indexing indicia in predetermined relation to images on said image-bearing sheet when said indexing sheet is placed in predetermined overlying relation to said image-bearing sheet, and positioning means on said projector for cooperating with said indexing indicia on said indexing sheet to locate a selected image on said image-bearing sheet in proper alinement with said optical window, said positioning means including a presser foot member overlying said optical window and resiliently pressing an interposed indexing sheet and image-bearing sheet toward said optical window, said presser foot member having an opaque portion of larger area than said optical window and having an opening therein of approximately the same size as and alined with said optical window so that the portion of the indicia on said indexing sheet which lies opposite said optical window may be read through said opening.

9. The combination with a series of substantially opaque double-faced image-bearing sheets of substantially uniform size, each sheet having on both faces thereof a multiplicity of separate miniature images arranged in predetermined numerical sequence with respect to the sheet and with respect to each other, of an indexing sheet of substantially the same size as all of said image-bearing sheets and having on one face numerical markings indicative of the locations of predetermined images on the remote face of an image-bearing sheet when the indexing sheet is laid on a near face of an image-bearing sheet in predetermined congruent relation thereto, and illuminating and projecting means including an optical window having a size approximately equal to the size of any individual one of the separate miniature images on any of said image-bearing sheets and also including lens means for projecting a magnified image of that part of an image-bearing sheet which is placed in overlying relation to said window, whereby an indexing sheet may be congruently laid on any selected one of the series of image-bearing sheets with the markings of the indexing sheet toward the eye of an observer and with the remote face of the selected image-bearing sheet in overlying relation to said optical window, to enable the observer readily to determine from the markings on the index sheet which one of the individual miniature images on the remote and hidden face of the image-bearing sheet is alined with said optical window of said illuminating and projecting means.

References Cited in the file of this patent

UNITED STATES PATENTS

| | | |
|---|---|---|
| 707,084 | Carman | Aug. 19, 1902 |
| 1,344,682 | Hernandez | June 29, 1920 |
| 1,460,071 | Merriman | June 26, 1923 |
| 1,807,614 | Bauersfeld | June 2, 1931 |
| 2,226,618 | Kuppenbender | Dec. 31, 1940 |
| 2,285,644 | Bernzott | June 9, 1942 |
| 2,307,211 | Goldsmith | Jan. 5, 1943 |
| 2,326,042 | Lessman | Aug. 3, 1943 |
| 2,338,400 | Bogue | Jan. 4, 1944 |
| 2,484,448 | Cook | Oct. 11, 1949 |
| 2,705,436 | Bradner | Apr. 5, 1955 |